United States Patent
Jang et al.

(10) Patent No.: US 11,898,912 B2
(45) Date of Patent: Feb. 13, 2024

(54) HYPERSPECTRAL IMAGING (HSI) APPARATUS AND INSPECTION APPARATUS INCLUDING THE SAME

(71) Applicant: Samsung Electronics Co., Ltd., Suwon-si (KR)

(72) Inventors: Sungho Jang, Hwaseong-si (KR); Jungchul Lee, Hwaseong-si (KR); Jinseob Kim, Incheon (KR); Gwangsik Park, Hwaseong-si (KR); Minhwan Seo, Hwaseong-si (KR); Janghwi Lee, Hwaseong-si (KR); Wondon Joo, Incheon (KR); Jiyoung Chu, Gyeongju-si (KR); Daehoon Han, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 17/365,592

(22) Filed: Jul. 1, 2021

(65) Prior Publication Data

US 2022/0170792 A1 Jun. 2, 2022

(30) Foreign Application Priority Data

Nov. 27, 2020 (KR) .................. 10-2020-0163339

(51) Int. Cl.
*G01J 3/28* (2006.01)
*G01J 3/02* (2006.01)
*G01J 3/24* (2006.01)
*G01J 3/04* (2006.01)

(52) U.S. Cl.
CPC .............. *G01J 3/2823* (2013.01); *G01J 3/021* (2013.01); *G01J 3/04* (2013.01); *G01J 3/24* (2013.01); *G01J 2003/2826* (2013.01)

(58) Field of Classification Search
CPC .. G01J 3/2823; G01J 3/021; G01J 3/04; G01J 3/24; G01J 2003/2826
See application file for complete search history.

(56) References Cited

U.S. PATENT DOCUMENTS 4,497,540 A * 2/1985 Breckinridge ........ G01J 3/2823
356/330
5,717,518 A * 2/1998 Shafer ................ G02B 17/0892
359/357

(Continued)

OTHER PUBLICATIONS

Thorlabs (Cylindrical Achromatic lens, https://www.thorlabs.com/newgrouppage9.cfm?objectgroup_id=5528) Wayback Oct. 16, 2014 (Year: 2014).*

(Continued)

*Primary Examiner* — Uzma Alam
*Assistant Examiner* — Jonathon Cook
(74) *Attorney, Agent, or Firm* — Muir Patent Law, PLLC

(57) ABSTRACT

Provided is a hyperspectral imaging (HSI) apparatus. The HSI apparatus includes: a first slit plate configured to introduce an output beam; a first aspherical mirror configured to reflect the introduced output beam; a first grating having a planar reflective surface, the first grating configured to generate a plurality of first split beams by splitting the output beam after being reflected by the first aspherical mirror; and a first camera configured to detect the plurality of first split beams.

20 Claims, 8 Drawing Sheets

(56) References Cited

U.S. PATENT DOCUMENTS

| | | | |
|---|---|---|---|
| 6,667,805 B2 * | 12/2003 | Norton | G01J 3/02 359/368 |
| 6,744,505 B1 * | 6/2004 | Wang | G01J 3/02 356/326 |
| 7,697,137 B2 * | 4/2010 | Comstock, II | G01J 3/02 359/566 |
| 7,843,568 B2 * | 11/2010 | Kivela | G01N 21/76 356/417 |
| 7,944,559 B2 | 5/2011 | Oskotsky et al. | |
| 9,055,213 B2 | 6/2015 | Venkataraman et al. | |
| 9,274,000 B2 | 3/2016 | Tovey | |
| 9,435,689 B2 | 9/2016 | Comstock et al. | |
| 2002/0176077 A1 * | 11/2002 | Caruso | G01J 3/2823 356/326 |
| 2007/0252989 A1 * | 11/2007 | Comstock | G01J 3/2823 356/328 |
| 2009/0225314 A1 | 9/2009 | Warren | |
| 2014/0118738 A1 * | 5/2014 | Comstock, II | G01J 3/021 29/527.1 |
| 2015/0022811 A1 | 1/2015 | Cornell et al. | |
| 2016/0356702 A1 * | 12/2016 | Hinnrichs | G01J 3/0208 |
| 2018/0224329 A1 | 8/2018 | Klubben, III et al. | |
| 2019/0089914 A1 * | 3/2019 | Richarte | G01J 3/2823 |
| 2020/0149961 A1 * | 5/2020 | Hidaka | G01J 3/10 |
| 2020/0184624 A1 * | 6/2020 | Jang | H04N 23/10 |

OTHER PUBLICATIONS

Carl R. (Rod) Nave, Department of Physics and Astronomy Georgia State University (http://hyperphysics.phy-astr.gsu.edu/hbase/geoopt/aber2.html) Wayback: Feb. 19, 2001 (Year: 2001).*

Reimers, J., Bauer, A., Thompson, K. et al. Freeform spectrometer enabling increased compactness. Light Sci Appl 6, e17026 (2017). https://doi.org/10.1038/lsa.2017.26 (Year: 2017).*

* cited by examiner

HYPERSPECTRAL IMAGING (HSI) APPARATUS AND INSPECTION APPARATUS INCLUDING THE SAME

CROSS-REFERENCE TO RELATED APPLICATION

This application is based on and claims priority under 35 U.S.C. § 119 to Korean Patent Application No. 10-2020-0163339, filed on Nov. 27, 2020, in the Korean Intellectual Property Office, the disclosure of which is incorporated by reference herein in its entirety.

BACKGROUND

The inventive concept relates to a hyperspectral imaging (HSI) apparatus and an inspection apparatus including the HSI apparatus.

The HSI technique is a technique for obtaining a spectrum for each pixel to evaluate the quality of an inspection object by performing, on the inspection object, processes such as identifying the presence or not and position of a particular object such as a defect, determining the material of the particular object, and the like. HSI apparatus may generate a hyperspectral image including a plurality of spectra for a line-shaped image through one measurement. The hyperspectral image may include a first axis corresponding to a wavelength and a second axis corresponding to a space (that is, a change in position of the inspection object in a lengthwise direction of the line shaped image). HSI apparatus may obtain a 2-dimensional image of an inspection object with respect to each wavelength or each band of wavelengths by scanning the inspection object in a direction perpendicular to a line extension direction of the hyperspectral image. As such, a set of 2-dimensional images of an inspection object with respect to wavelengths is referred to as a 3-dimensional hyper-cube image.

SUMMARY

The inventive concept provides a hyperspectral imaging (HSI) apparatus having improved reliability.

Aspects of the inventive concept are not limited to the aspects set forth above, and other aspects of the inventive concept will be clearly understood by those of ordinary skill in the art from the following descriptions.

According to an aspect of the inventive concept, there is provided a hyperspectral imaging (HSI) apparatus. The HSI apparatus includes: a first slit plate configured to introduce an output beam; a first aspherical mirror configured to reflect the introduced output beam; a first grating having a planar reflective surface, the first grating configured to generate a plurality of first split beams by splitting the output beam after being reflected by the first aspherical mirror; and a first camera configured to detect the plurality of first split beams.

According to another aspect of the inventive concept, there is provided an inspection apparatus including: an input optical system configured to irradiate a wafer with an input beam; and an HSI apparatus configured to generate a hyperspectral image based on an output beam generated by reflecting the input beam from the wafer. The HSI apparatus includes: a slit plate configured to introduce the output beam; an aspherical mirror configured to reflect the introduced output beam; a first grating configured to generate a plurality of split beams by splitting the output beam after being reflected by the aspherical mirror; and a first camera configured to detect the plurality of split beams.

According to yet another aspect of the inventive concept, there is provided an inspection apparatus. The inspection apparatus includes: a dichroic mirror configured to split an output beam into a first output beam having a first wavelength band and a second output beam having a second wavelength band; a first HSI optical system including a first aspherical mirror configured to reflect the first output beam, a first grating configured to generate a plurality of first split beams by reflecting the first output beam, and a first camera configured to receive the plurality of first split beams; and a second HSI optical system including a second aspherical mirror configured to reflect the second output beam, a second grating configured to generate a plurality of second split beams by reflecting the second output beam, and a second camera configured to receive the plurality of second split beams

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
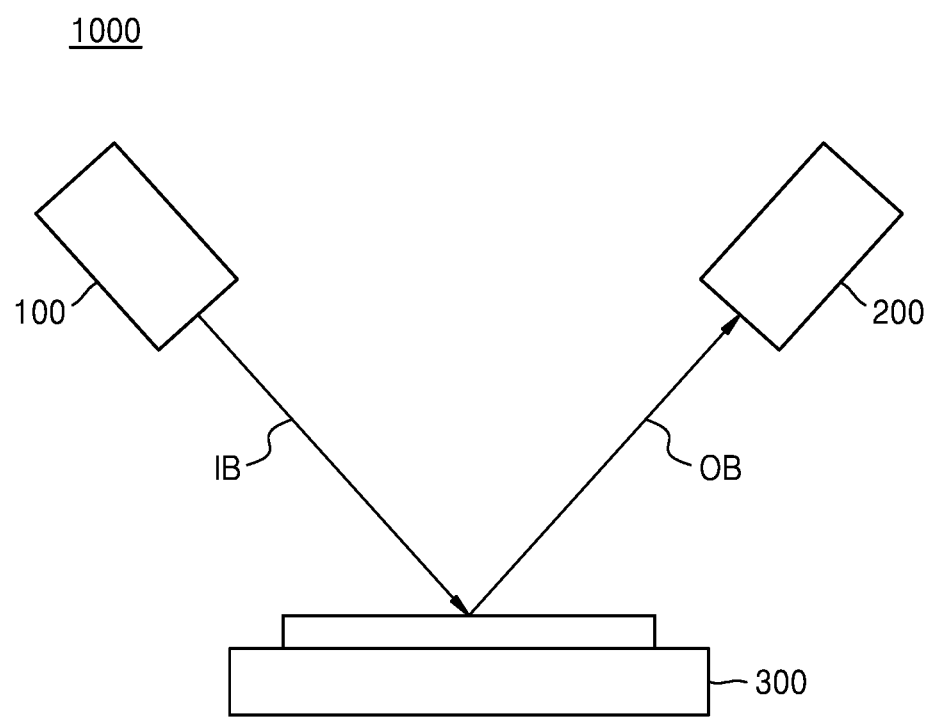
FIG. 1 is a diagram illustrating an inspection apparatus according to example embodiments.

Hereinafter, embodiments of the inventive concept will be described in detail with reference to the accompanying drawings. Like components are denoted by like reference numerals throughout the specification, and repeated descriptions thereof are omitted.

FIG. 1 is a diagram illustrating an inspection apparatus according to example embodiments.

Referring to FIG. 1, an inspection apparatus 1000 of the present embodiment may include an input optical system 100, a hyperspectral imaging (HSI) apparatus 200, and a stage 300. In the example of FIG. 1, although the inspection apparatus 1000 is shown as including an inclined optical system, this is provided for illustration and does not limit the inventive concept in any way. For example, the inspection apparatus 1000 may include a vertical optical system.

Hereinafter, although descriptions will be made based on the assumption that an object inspected by the inspection apparatus 1000 is a wafer W including a semiconductor material, those of ordinary skill in the art could easily reach an inspection apparatus for inspecting any inspection objects such as a glass substrate and an individual semiconductor package, based on the descriptions given herein.

The input optical system 100 may generate an input beam IB for inspection and the input beam IB may irradiate the wafer W. The input optical system 100 may include a light source and an illumination optical system. The light source may generate and output light having broadband wavelengths. Light generated by the light source may have wavelengths in ranges of ultraviolet light, visible light, near-infrared light, and infrared light. For example, according to some embodiments, the light source may generate and output light in a band of about 200 nm to about 2100 nm. The light source may include, but is not limited to, a halogen lamp light source, a Xe lamp light source, or a light-emitting diode (LED) light source.

The illumination optical system may include, for example, a condensing lens, a mirror, and the like. The illumination optical system may reflect and focus light generated by the light source, thereby allowing a wafer on the stage 300 to be irradiated with the light. A beam transfer optical system for transferring light generated by the light source may be provided between the light source and the illumination optical system. The illumination optical system may further include a collimating lens for the input beam IB to be transferred as parallel light.

The HSI apparatus 200 may generate a hyperspectral image having a line/bar shape, based on an output beam OB reflected by the wafer W. The inspection apparatus 1000 may further include a beam transfer system arranged between the HSI apparatus 200 and the wafer W. The beam transfer system may include a plurality of mirrors and a plurality of lenses. A configuration of the HSI apparatus 200 will be described in more detail with reference to FIG. 4.

According to example embodiments, the HSI apparatus 200 may take an image of a line-shaped portion of the wafer W by scanning the line-shaped portion in a direction perpendicular to an extension direction of the line-shaped portion. The scanning may be performed by moving, by the stage 300, the wafer W, or by driving a scan mirror (for example, a Galvano mirror) included in the inspection apparatus 1000. Here, the scanning by the inspection apparatus 1000 will be described in more detail with reference to FIGS. 2 and 3.

Figure 2:
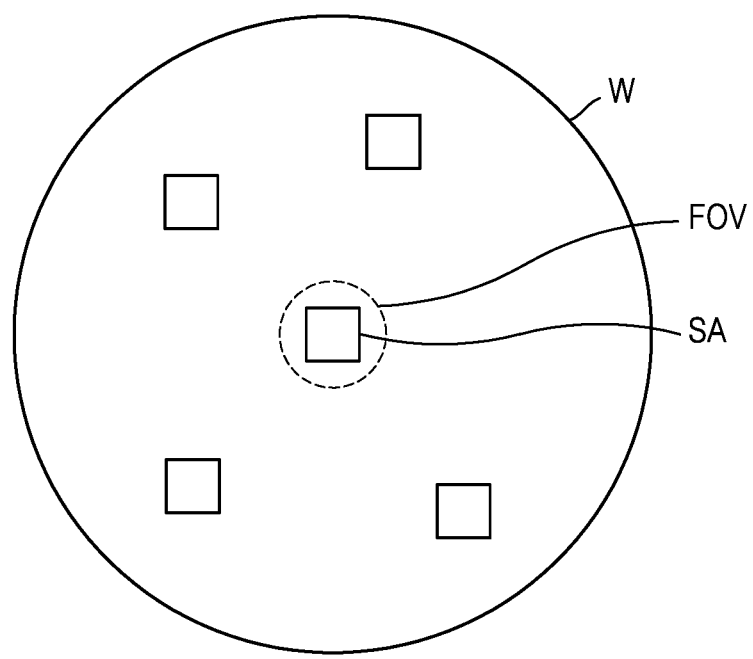
FIG. 2 is a plan view illustrating sample areas on a wafer.
Figure 3:
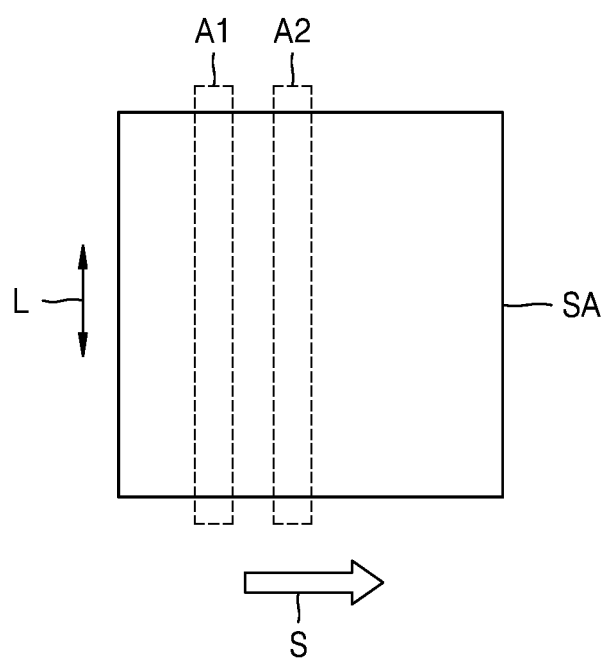
FIG. 3 is a partial enlarged plan view illustrating a sample area of FIG. 2.

FIG. 2 is a plan view illustrating sample areas SA on a wafer, and FIG. 3 is an enlarged view of a sample area SA. FIG. 3 is a partial enlarged plan view of one of the samples areas SA of FIG. 2.

Referring to FIGS. 1, 2, and 3, a plurality of sample areas SA may be selected from the wafer W. A sample area SA may be a selected area capable of representing a state of the wafer W, and although the state of the wafer W may be more accurately inspected as more sample areas SA are selected, the time required for inspection may be increased. Accordingly, a suitable number of sample areas SA may be selected by considering the accuracy of inspection and the inspection time.

The sample area SA is marked by a rectangular shape in FIG. 2, and this is because an HSI process is performed on a rectangular 2D area defined by a line direction L and a scan direction SD, as shown in FIG. 3. However, the sample area SA having another shape, for example, a circular shape or an elliptical shape, instead of the rectangular shape, may be selected.

In FIG. 3, areas A1 and A2 marked by bars extending in the line direction L may represent portions of the sample area SA, which are imaged by the HSI apparatus 200 through one shot or exposure. Each of the areas A1 and A2 may be, but is not limited to, for example, a field of view (FOV) of the HSI apparatus 200. According to example embodiments, an area of the wafer W irradiated with the input beam IB may be, but is not limited to, an elliptical area overlapping the areas A1 and A2. The area of the wafer W irradiated with the input beam IB may include the areas A1 and A2. For example, in a first exposure, an image of a first exposure area (for example, A1) may be generated by the HSI apparatus 200, and after the movement in the scan direction SD, in a second exposure, an image of a second exposure area (for example, A2) may be generated by the HSI apparatus 200. In FIG. 3, although the first exposure area A1 and the second exposure area A2 are shown as being apart from each other, this is merely for convenience of description, and the exposure areas may be actually arranged to be substantially consecutive in the scan direction SD.

The HSI apparatus 200 may scan the sample area SA of the wafer W in a direction perpendicular to the line direction L, thereby generating a 3-dimensional hyper-cube image of the sample area SA of the wafer W. Here, the 3-dimensional hyper-cube image may be a 3-dimensional image of the sample area SA of the wafer W with respect to different perpendicular axes respectively corresponding to wavelengths, the line direction L, and the scan direction SD. For example the perpendicular axes may include a wavelength axis and two spatial axes of the line direction L and the scan direction SD. The state of the wafer W may be determined by analyzing the 3-dimensional hyper-cube image. Here, the state of the wafer W may include, for example, a thickness of a thin film on the wafer W, a shape or critical dimension (CD) of a pattern of the thin film, and the like.

In the inspection apparatus 1000 according to example embodiments, the analysis of the 2D HSI image or the 3-dimensional hyper-cube image, which is obtained by the HSI apparatus 200 for the sample area SA of the wafer W, may be performed as described below. For example, when the thickness of the thin film formed on the wafer W is inspected, line-shaped HSI images included in the 3-dimensional hyper-cube image may each vary depending on the thickness of the thin film. This is because light intensity of each pixel of the line-shaped HSI images may at least partially rely/depend on a photo reflectance and/or a spectroscopic efficiency of the sample area SA of the wafer W and the photo reflectance and/or the spectroscopic efficiency may at least partially rely/depend on the thickness of the thin film on the sample area SA, the shape or CD of the pattern of the thin film, or the like.

Data regarding the thickness of the thin film and regarding the photo-intensity of the 3-dimensional hyper-cube image with respect to the thickness of the thin film may be quantified and stored in a database and may be used as reference data for subsequent processes and samples. According to example embodiments, the 3-dimensional hyper-cube image of the sample area SA of the wafer W may be generated by the inspection apparatus 1000, and data regarding the generated 3-dimensional hyper-cube image may be compared with the reference data, which is stored in the database, regarding the 3-dimensional hyper-cube image, thereby determining the thickness of the thin film on the wafer W, the shape or CD of the pattern of the thin film, or the like. Such an inspection method is referred to as a database-to-die inspection method.

However, the inventive concept is not limited thereto, and the inspection performed by the inspection apparatus 1000 may include and/or may be lot-to-lot inspection based on a historical log for previous lots, wafer-to-wafer inspection based on comparison between different wafers in one lot (e.g., in the same lot), or die-to-die inspection in which different chips/dies in one wafer (e.g., in the same wafer) are compared with each other. According to example embodiments, a systematic error of a specific process which is performed on the wafer W, or a tendency of a result of a process performed on the wafer W may be found out by one of the above-described inspections.

The thin film on the wafer W may include a single layer, or a multilayer including a plurality of layers. In addition, when the thin film includes a multilayer, data regarding a 3-dimensional hyper-cube image with respect to a thickness of each layer may be quantified and stored in the database. Thus, the thickness of each layer of the multilayer thin film may be determined by obtaining a 3-dimensional hyper-cube image of the multilayer thin film by the inspection apparatus 1000. It will be easily understood by those of ordinary skill in the art that one of the kind of material of the thin film on the wafer W, the shape of the pattern of the thin film, and the CD of the pattern may be inspected in a similar manner to that described herein.

The stage 300 may support the wafer W arranged on the stage 300. The stage 300 may move the wafer W in a vertical direction, for example, a Z direction, such that one of the sample areas SA (see FIG. 2) of the wafer W is positioned at a focal plane of at least one of the input beam D3 and the HSI apparatus 200. The stage 300 may move the wafer W in a horizontal direction, for example, X and Y directions, such that the wafer W is within the FOV of the HSI apparatus 200. The stage 300 may align an orientation of the wafer W with respect to the FOV of the HSI apparatus 200 by rotating the wafer W about an axis parallel to the Z direction.

Here, the X direction and the Y direction are respectively two directions that are parallel to a top surface of the stage 300 and perpendicular to each other. In addition, the Z direction is a direction perpendicular to the top surface of the stage 300.

According to example embodiments, the inspection apparatus 1000 may further include an analysis device, although not shown. The analysis device may measure/inspect the state of the wafer W by analyzing an HSI image or a 3-dimensional hyper-cube image through an analysis program. The analysis device may include a processor and a memory device, which allow the analysis program to be executed.

Here, the processor may include a simple controller, a complicated processor such as a microprocessor, a central processing unit (CPU), or a graphics processing unit (GPU), a processor configured by software, dedicated hardware, or firmware. The processor may be implemented by, for example, a general-purpose computer, a digital signal processor (DSP), a field programmable gate array (FPGA), or application-specific hardware such as an application-specific integrated circuit (ASIC).

Here, the memory device may include nonvolatile memory such as NAND-type flash memory. According to some embodiments, the memory device may include phase-change random access memory (PRAM), magnetic RAM (MRAM), resistive RAM (ReRAM), ferroelectric RAM (FRAM), NOR flash memory, or the like. According to some embodiments, the memory device may include a volatile memory device, such as dynamic RAM (DRAM) or static RAM (SRAM), in which data is lost when power is cut off.

Figure 4:
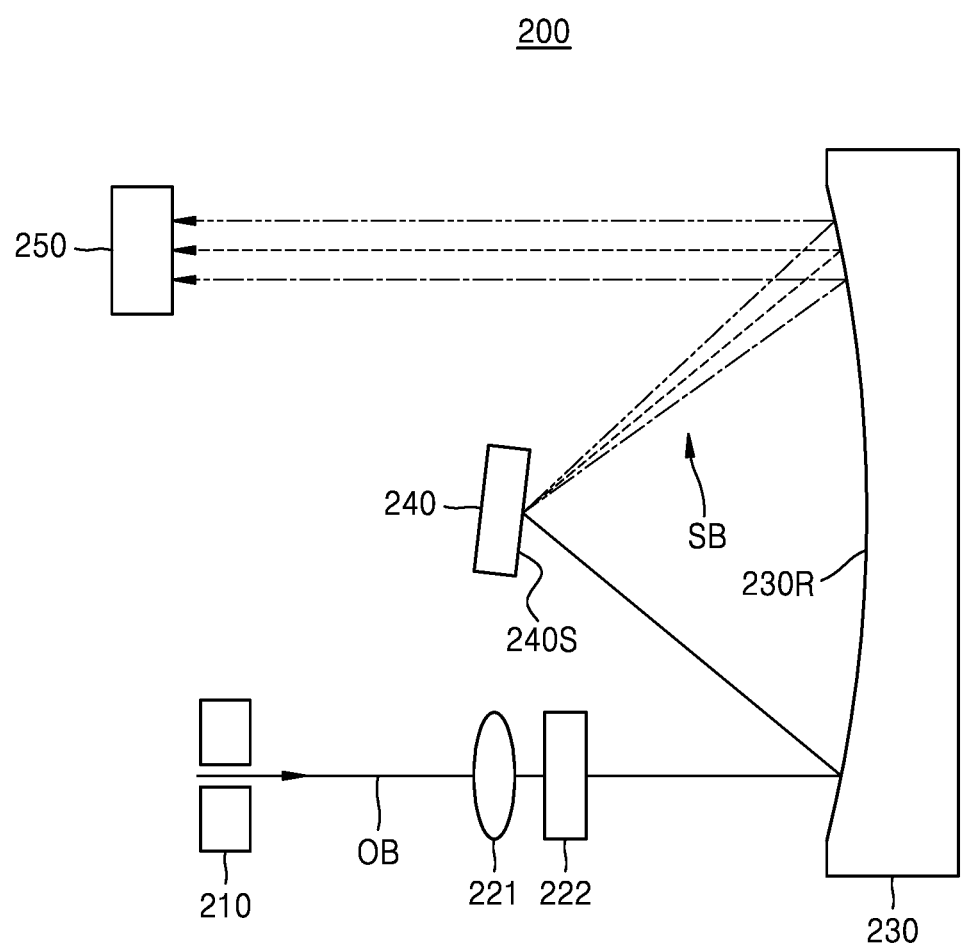
FIG. 4 is a diagram illustrating a hyperspectral imaging (HSI) apparatus, which is included in an inspection apparatus, according to example embodiments.

FIG. 4 is a diagram illustrating the HSI apparatus 200, which is included in the inspection apparatus 1000, according to example embodiments.

Referring to FIGS. 1 and 4, the HSI apparatus 200 may include an optical system having a different configuration from the Offner configuration. The HSI apparatus 200 may include an optical system having a quasi-Offner configuration. The HSI apparatus 200 may include a slit plate 210, a first compensation lens 221, a second compensation lens 222, an aspherical mirror 230, a grating 240, and a camera 250.

Here, the optical system having the Offner configuration is an optical system using two spherical mirrors and may substantially remove chromatic aberration in the optical system. Accordingly, an HSI apparatus based on the Offner configuration includes a spherical grating. Unlike this, the quasi-Offner configuration of the HSI apparatus 200 according to example embodiments of the present disclosure may not include a spherical grating. The quasi-Offner configuration of the HSI apparatus 200 according to example embodiments may include the aspherical mirror 230 and the grating 240 that has a planar shape. For example, the grating 240 may be a diffraction grating and may have a planar surface. For example, the gating 240 may be a reflective grating and may have a planar reflective surface.

The slit plate 210 may include a slit S having a line/bar shape. Light, which is incident on the HSI apparatus 200, may be changed into line-shaped light by passing through the slit S. For example, the slit plate 210 may limit a cross-section of the output beam OB to form a line-shaped light. According to example embodiments, the slit S may have a length of about 13 mm and a width of about 6.5 µm. Here, the length of the slit S may be a length thereof in the extension direction of the areas A1 and A2 of FIG. 3. According to example embodiments, the slit S may function as an aperture for the output beam OB.

According to example embodiments, a numerical aperture of an optical system, which includes the first and second compensation lenses 221 and 222, the aspherical mirror 230, the grating 240, and the camera 250, may range from about 0.06 to about 0.1. According to example embodiments, the numerical aperture of the optical system, which includes the first and second compensation lenses 221 and 222, the aspherical mirror 230, the grating 240, and the camera 250, may be, but is not limited to, about 0.08 or more (e.g., between 0.08 and 0.1). According to example embodiments, the numerical aperture of the optical system, which includes the first and second compensation lenses 221 and 222, the aspherical mirror 230, the grating 240, and the camera 250, may have a sufficiently large value, and thus, the spatial resolution and spectral resolution of the HSI apparatus 200 may be improved. Here, the spectral resolution refers to a wavelength spacing of light sensed by adjacent pixels of the camera 250. As the spectral resolution increases, the spacing between wavelengths included in spectrum data decreases, and thus, more precise spectrum data may be obtained.

The output beam OB having passed through the slit S may pass through the first and second compensation lenses 221 and 222. For example, the first compensation lens 221 may be a spherical lens, and the second compensation lens 222 may be a cylindrical lens. According to example embodiments, the first and second compensation lenses 221 and 222 may compensate for a path difference with respect to a corresponding wavelength. For example, the first and second compensation lenses 221 and 222 may compensate for aberration between wavelengths of the output beam OB. For example, split beams SB, which are reflected by the grating 240, may have different optical paths from each other depending on wavelengths thereof. Accordingly, the length of the optical path of each of the split beams SB may vary depending on the wavelength thereof. According to example embodiments, each of the first and second compensation lenses 221 and 222 may compensate for a difference in the length between the optical paths depending on the wavelengths and may allow the reliability of the HSI apparatus 200 to be improved. In some cases, one of the first and second compensation lenses 221 and 222 may be omitted.

The aspherical mirror 230 may have a reflective surface 230R that is an aspherical surface. The reflective surface 230R may have a concave shape. According to example embodiments, the HSI apparatus 200 includes the aspherical mirror 230. The output beam OB reflected by a first portion of the aspherical mirror 230 may be reflected by the grating 240.

According to example embodiments, the grating 240 may be a reflective grating having a flat plate shape. The grating 240 may include a grid structure including a plurality of grooves. The grid structure may be formed on one surface 240S of the grating 240. According to example embodiments, about 100 to about 300 grooves per millimeter (mm) may be formed on the one surface 240S of the grating 240.

Although the grating 240 may be aligned approximately in the vicinity of the center of the aspherical mirror 230, the inventive concept is not limited thereto. According to example embodiments, the normal line to the one surface 240S of the grating 240 may be tilted with respect to an optical axis of the aspherical mirror 230. Accordingly, although an incident angle of the output beam OB, which is incident on the grating 240, may be substantially equal to an exit angle (e.g., a reflection angle) of the split beams SB, which exit (e.g., reflected) from the grating 240, the inventive concept is not limited thereto.

According to example embodiments, the grating 240 may split light in a wavelength band of about 200 nm to about 2100 nm. According to example embodiments, the grating 240 may split light in a wavelength band of about 250 nm to about 1000 nm. According to example embodiments, the grating 240 may split light in a wavelength band of about 250 nm to about 500 nm.

As described above, although the Offner configuration according to the related art includes a curved grating, it is hard to mass produce the curved grating. The HSI apparatus 200 according to example embodiments of the present disclosure may include the flat plate-shaped grating 240 having high mass-productivity, and thus, may be used as an inspection apparatus in various industrial applications, such as semiconductor device fabrication and the like.

The split beams SB, which are generated by a reflection of the output beam OB by the grating 240, may respectively have different wavelengths. The plurality of split beams SB may be reflected again by a second portion of the aspherical mirror 230, which is different from the first portion of the aspherical mirror 230, and then detected by the camera 250. The HSI apparatus 200 according to example embodiments includes the optical system using the aspherical mirror 230 despite the relatively large numerical aperture (for example, 0.08 or more) of the slit, thereby allowing a relatively small spot area in comparison with the case of adopting a spherical mirror, which is defined by the superposition of the split beams SB reaching the camera 250, to be reduced.

The camera 250 may generate a hyperspectral image as described above. The camera 250 may be, for example, a charge-coupled device (CCD) camera. In another example, the camera 250 may include a complementary metal oxide semiconductor (CMOS) image sensor. Although the image sensor of the camera 250 may be on an image plane of the split beams SB, the inventive concept is not limited thereto.

Figure 5:
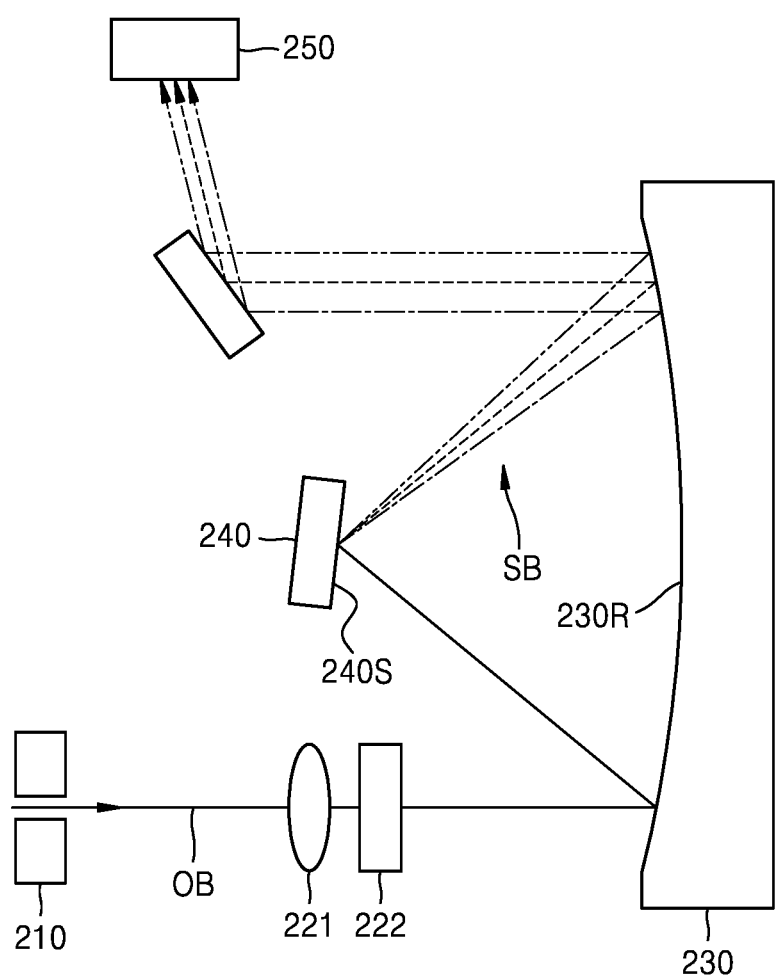
FIG. 5 is a diagram illustrating an HSI apparatus, which is included in an inspection apparatus, according to other example embodiments.

FIG. 5 is a diagram illustrating an HSI apparatus 201 according to other example embodiments.

Referring to FIG. 5, although the HSI apparatus 201 is similar to the HSI apparatus 200 of FIG. 4, the HSI apparatus 201 may further include a planar mirror between the camera 250 and the aspherical mirror 230. In general, due to a distance between an optical window of the camera 250 and an image sensor thereof, when the image sensor of the camera 250 is located on a focal point of the aspherical mirror 230, there may be physical interference, such as contact, between outer components (for example, a barrel and the optical window) of the camera 250 and other optical elements such as the grating 240.

According to example embodiments, the HSI apparatus 201 may reflect, again, the output beam OB, which is split by the grating 240 and then reflected by the aspherical mirror 230, thereby sufficiently securing an optical path for focusing, on the image sensor, light reflected by the aspherical mirror 230. For example, the split beams SB reflected by the aspherical mirror 230 may be reflected again by a reflection plate before focused on the image sensor of the camera 250 as illustrated in FIG. 5. Accordingly, the interference between the camera 250 and optical components other than the camera 250 may be prevented, and thus, the provision of an optical system of the HSI apparatus 201, including alignment between the optical components, may be facilitated.

Figure 6:
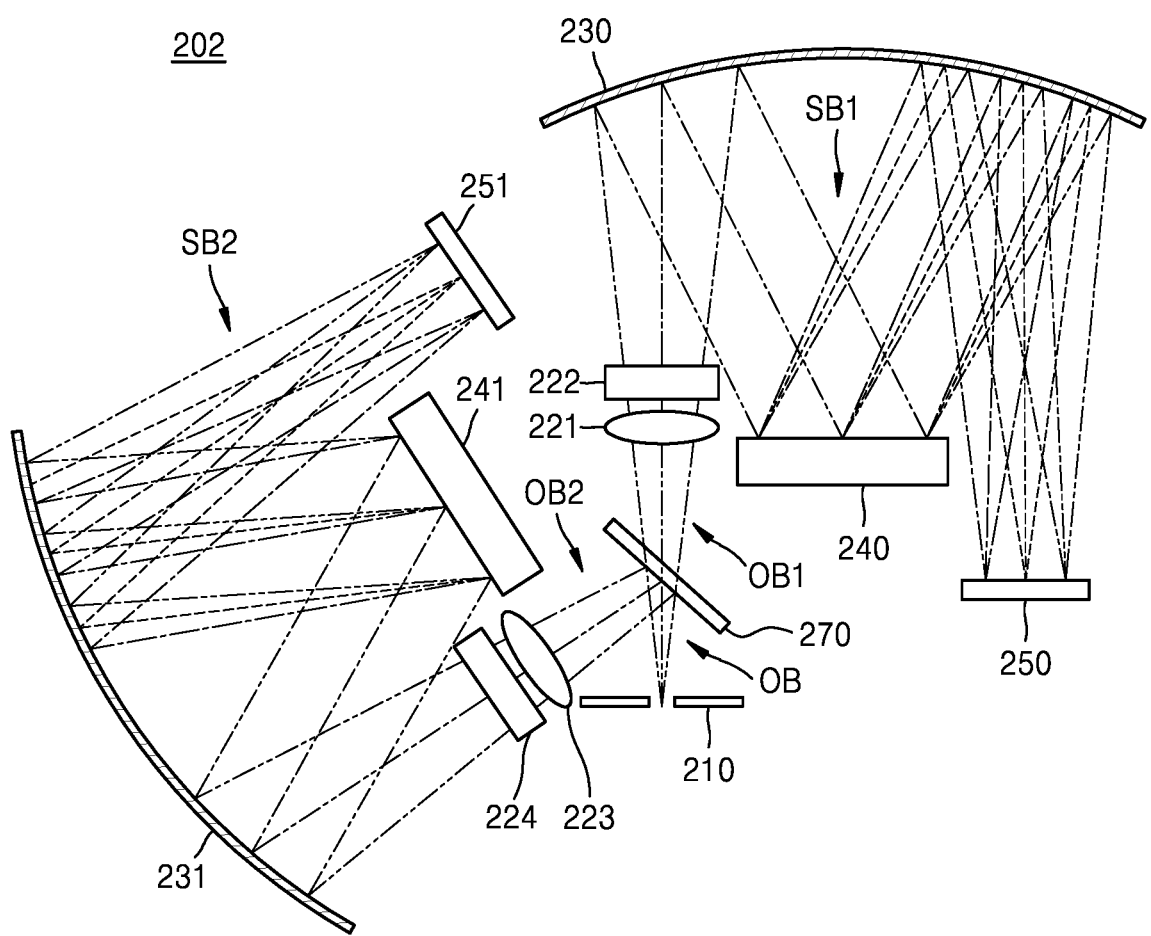
FIG. 6 is a diagram illustrating an HSI apparatus, which is included in an inspection apparatus, according to other example embodiments.

FIG. 6 is a diagram illustrating an HSI apparatus 202 according to other example embodiments.

Many components of the example embodiments illustrated in FIG. 6 may be the same as or similar to the components of the embodiments illustrated in FIG. 4. Therefore, repeated descriptions given with reference to FIG. 4 will be omitted for convenience of description, and differences from the example of FIG. 4 will be mainly described.

Referring to FIG. 6, similarly to the HSI apparatus 200 of FIG. 4, the HSI apparatus 202 may include a slit plate 210, a first compensation lens 221, a second compensation lens 222, an aspherical mirror 230, a grating 240, and a camera 250. The HSI apparatus 202 may further include a dichroic mirror/filter 270, a third compensation lens 223, a fourth compensation lens 224, an aspherical mirror 231, a grating 241, and a camera 251.

The dichroic mirror/filter 270 may have different reflectance depending on wavelengths. For example, the dichroic mirror/filter 270 may have low reflectance and high transmittance for a first wavelength band and may have high reflectance and low transmittance for a second wavelength band that is different from the first wavelength band. Accordingly, the dichroic mirror/filter 270 may split an incident beam into a first output beam OB1 having the first wavelength band and a second output beam OB2 having the second wavelength band. For example, the first output beam OB1 may transmit the dichroic mirror/filter 270 and the second output beam OB2 may be reflected from the dichroic mirror/filter 270. Here, although the first wavelength band may range from about 250 nm to about 500 nm and the second wavelength band may range from about 500 nm to about 1100 nm, the inventive concept is not limited thereto.

The first compensation lens 221, the second compensation lens 222, the aspherical mirror 230, the grating 240, and the camera 250 may constitute a first optical system for generating a hyperspectral image based on the first wavelength band, and the third compensation lens 223, the fourth compensation lens 224, the aspherical mirror 231, the grating 241, and the camera 251 may constitute a second optical system for generating a hyperspectral image based on the second wavelength band.

The first compensation lens 221, the second compensation lens 222, the aspherical mirror 230, the grating 240, and the camera 250 may generate a first hyperspectral image based on first split beams SB1 having the first wavelength band, in a similar manner to that described above with reference to FIG. 4.

The third compensation lens 223, the fourth compensation lens 224, the aspherical mirror 231, the grating 241, and the camera 251 may also generate a second hyperspectral image based on second split beams SB2 having the second wavelength band, in a similar manner to that described above with reference to FIG. 4.

According to example embodiments, the grating 240 and the grating 241 may have different spectroscopic performances from each other. The grating 240 corresponding to the first wavelength band, which is a band of relatively smaller wavelengths, may have higher spectroscopic performance than the grating 241 corresponding to the second wavelength band, which is a band of relatively larger wavelengths. According to other example embodiments, a bandwidth of the first wavelength band may be substantially equal to a bandwidth of the second wavelength band.

According to example embodiments, the grating 240 may include a greater number of grooves than the grating 241. For example, the grating 241 may include 100 grooves per millimeter, and the grating 240 may include 150 grooves per millimeter. In another example, the grating 241 may include 150 grooves per millimeter, and the grating 240 may include 200 grooves per millimeter. However, the inventive concept is not limited thereto, and the gratings 240 and 241 may include an equal number of grooves.

According to example embodiments illustrated in FIG. 6, the HSI apparatus 202 including two HSI optical systems is provided, whereby the spectroscopic efficiency of the gratings 240 and 241 may be optimized, and the HSI apparatus 202 having high wavelength resolution may be implemented. In addition, line-scanning is performed by synchronizing the two cameras 250 and 251, whereby about twice data may be obtained by measurement for the same time period as an example according to the related art, and thus, the reliability of inspection may be improved.

Figure 7:
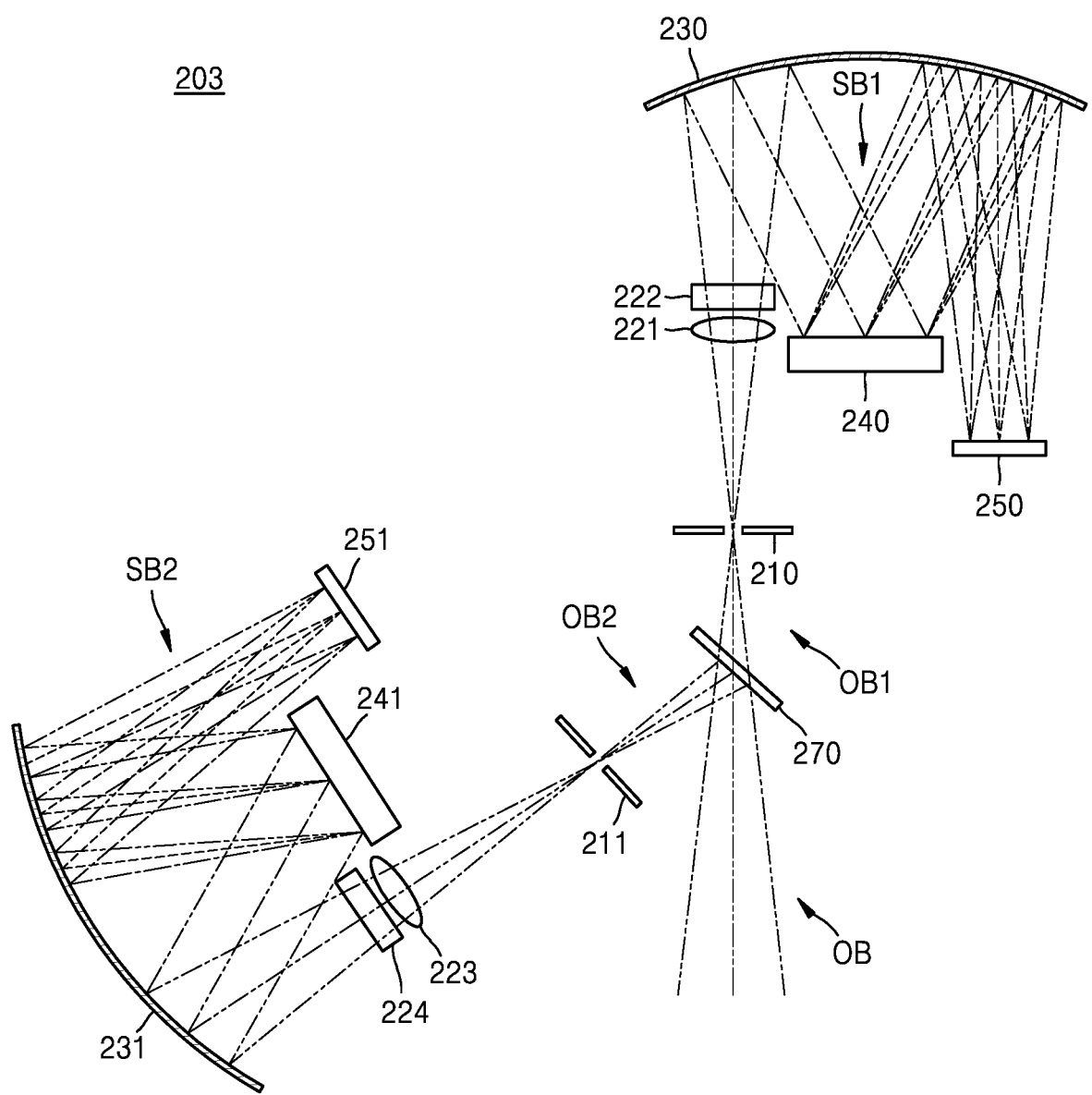
FIG. 7 is a diagram illustrating an HSI apparatus, which is included in an inspection apparatus, according to other example embodiments.

FIG. 7 is a diagram illustrating an HSI apparatus 203 according to other example embodiments.

Many components of the example embodiments illustrated in FIG. 7 may be the same as or similar to the components of the embodiments illustrated in FIG. 6. Therefore, repeated descriptions given with reference to FIG. 6 will be omitted for convenience of description, and differences from the example of FIG. 6 will be mainly described.

According to example embodiments, similar to the HSI apparatus 202 of FIG. 6, the HSI apparatus 203 may include a slit plate 210, first to fourth compensation lenses 221, 222, 223, and 224, aspherical mirrors 230 and 231, gratings 240 and 241, and cameras 250 and 251, and a dichroic mirror 270. The HSI apparatus 203 may include an additional slit plate 211.

Unlike the HSI apparatus 202 of FIG. 6, the HSI apparatus 203 may include the dichroic mirror 270 arranged ahead of a focal plane of the output beam OB. By the dichroic mirror 270, the output beam OB may be split into the first output beam OB1 having the first wavelength band and the second output beam OB2 having the second wavelength band. The slit plate 210 may be arranged on a focal plane of the first output beam OB1, and the slit plate 211 may be arranged on a focal plane of the second output beam OB2. For example, the slit plates 210 and 211 may respectively limit cross-sections of the first and second output beams OB1 and OB2 to form line-shaped light beams.

The slit plate 210, the first compensation lens 221, the second compensation lens 222, the aspherical mirror 230, the grating 240, and the camera 250 may constitute a first optical system for generating a hyperspectral image based on the first wavelength band, and the slit plate 211, the third compensation lens 223, the fourth compensation lens 224, the aspherical mirror 231, the grating 241, and the camera 251 may constitute a second optical system for generating a hyperspectral image based on the second wavelength band.

Figure 8:
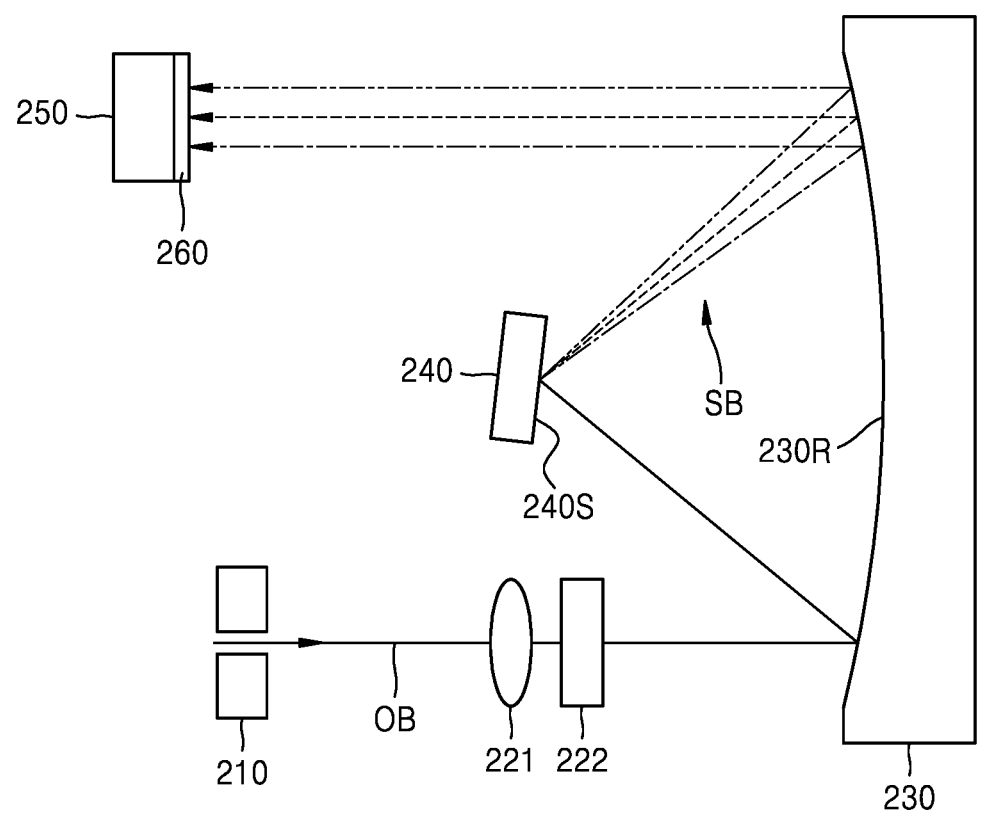
FIG. 8 is a diagram illustrating an HSI apparatus according to other example embodiments.

FIG. 8 is a diagram illustrating an HSI apparatus 204 according to other example embodiments.

Many components of the example embodiments illustrated in FIG. 8 may be the same as or similar to the components of the embodiments illustrated in FIG. 4. Therefore, repeated descriptions given with reference to FIG. 4 will be omitted for convenience of description, and differences from the example of FIG. 4 will be mainly described.

Referring to FIG. 8, the HSI apparatus 204 may include a slit plate 210, a first compensation lens 221, a second compensation lens 222, an aspherical mirror 230, a grating 240, and a camera 250.

According to example embodiments, the HSI apparatus 204 may further include a diffraction order selection filter 260 between the aspherical mirror 230 and the camera 250. According to example embodiments, although the HSI apparatus 204 may be arranged for the diffraction order selection filter 260 to be disposed on a cover glass of the camera 250, the inventive concept is not limited thereto.

According to example embodiments, the diffraction order selection filter 260 may pass a split beam SB having a diffraction order targeted by inspection and may cut off a split beam SB having a diffraction order not targeted by inspection. For example, the diffraction order selection filter 260 may block split beams SB having diffraction orders other than the targeted diffraction order.

For example, when the camera 250 generates a hyperspectral image based on a split beam SB corresponding to a first-order diffraction component, the diffraction order selection filter 260 may pass the split beam SB corresponding to the first-order diffraction component and may cut off a split beam SB corresponding to a second-order and/or a higher diffraction component. For example, when a particular pixel of the camera 250 is configured to detect light having a wavelength of $\lambda_1$, the diffraction order selection filter 260 may prevent light having a wavelength of $\lambda_2$ satisfying $\lambda_2=(\lambda_1)/2$ from being incident on the particular pixel.

However, the inventive concept is not limited thereto, and the camera 250 may generate a hyperspectral image based on a split beam SB corresponding to a second-order or a higher diffraction component, and in this case, the diffraction order selection filter 260 may cut off a split beam SB other than the second-order and/or the higher diffraction component.

According to example embodiments, a wavelength of the split beam SB incident on each pixel varies depending on positions of pixels of the camera 250, and the diffraction order selection filter 260 may be, but is not limited to, a linear variable filter having a pass-band wavelength varying with positions therein. For example, the diffraction order selection filter 260 may include one of a high-pass filter, a low-pass filter, and a combination thereof.

While the inventive concept has been particularly shown and described with reference to embodiments thereof, it will be understood that various changes in form and details may be made therein without departing from the spirit of the inventive concept and the scope of the invention should be determined by the following claims.

What is claimed is:

1. A hyperspectral imaging (HSI) apparatus comprising:
a first slit plate configured to introduce an output beam;
a first aspherical mirror configured to reflect the output beam which is introduced by the first slit plate;
a first planar grating having a planar reflective surface configured to generate a plurality of first split beams by splitting the output beam after its reflection by the first aspherical mirror; and
a first camera configured to detect the plurality of first split beams to obtain at least one of a two-dimensional HSI image and a 3-dimensional hyper-cube image,
wherein the reflection of the output beam by the first aspherical mirror is directly reflected to the first planar grating from the first aspherical mirror,
wherein the first planar grating provides the plurality of first split beams directly to the first aspherical mirror, and
wherein the plurality of first split beams are reflected by the first aspherical mirror to be provided to the first camera.

2. The HSI apparatus of claim 1, wherein the HSI apparatus is configured that the plurality of first split beams are reflected by the first aspherical mirror and reach the first camera.

3. The HSI apparatus of claim 2, further comprising:
a mirror configured to reflect the plurality of first split beams after being reflected by the first aspherical mirror and before reaching the first camera.

4. The HSI apparatus of claim 1, further comprising:
a first compensation lens between the first slit plate and the first aspherical mirror, the first compensation lens configured to compensate for aberration between wavelengths of the output beam,
wherein the first compensation lens comprises a spherical lens.

5. The HSI apparatus of claim 4, further comprising:
a second compensation lens between the first slit plate and the first aspherical mirror, the second compensation lens configured to compensate for aberration between wavelengths of the output beam,
wherein the second compensation lens comprises a cylindrical lens, and
wherein the first compensating lens and the second compensating lens integrally compensate for a path length difference according to wavelengths of the plurality of first split beams.

6. The HSI apparatus of claim 1, wherein a numerical aperture of a first optical system, which comprises the first aspherical mirror, the first planar grating, and the first camera, ranges from 0.06 to 0.1, and
the first planar grating comprises 100 to 300 grooves per millimeter.

7. The HSI apparatus of claim 1, further comprising:
a diffraction order selection filter between the first aspherical mirror and the first camera,
wherein the diffraction order selection filter is configured to pass a first portion of the first split beams corresponding to a first-order diffraction component and to cut off a second portion of the first split beams corresponding to a second-order diffraction component.

8. The HSI apparatus of claim 1, further comprising:
a dichroic mirror arranged on an optical path of the output beam, the dichroic mirror configured to split the output beam into a first output beam having a first wavelength band and a second output beam having a second wavelength band;
a second aspherical mirror configured to reflect the second output beam;
a second grating configured to generate a plurality of second split beams by splitting the second output beam after being reflected by the second aspherical mirror; and
a second camera configured to detect the plurality of second split beams.

9. The HSI apparatus of claim 8, wherein the dichroic mirror is arranged between the first slit plate and the first aspherical mirror.

10. The HSI apparatus of claim 8, further comprising:
a second slit plate arranged on an optical path of the second output beam between the second aspherical mirror and the dichroic mirror,
wherein the first slit plate is arranged between the first aspherical mirror and the dichroic mirror.

11. An inspection apparatus comprising:
an input optical system configured to irradiate a wafer with an input beam; and
a hyperspectral imaging (HSI) apparatus configured to generate a hyperspectral image based on an output beam that is generated by reflecting the input beam from the wafer,
wherein the HSI apparatus comprises:
a slit plate configured to introduce the output beam;
an aspherical mirror configured to reflect the introduced output beam;
a planar grating having a planar reflective surface configured to generate a plurality of split beams by splitting the output beam after its reflection by the aspherical mirror; and
a camera configured to detect the plurality of split beams to obtain at least one of a two-dimensional HSI image and a 3-dimensional hyper-cube image,
wherein the reflection of the output beam by the aspherical mirror is directly reflected to the grating from the aspherical mirror,
wherein the grating provides the plurality of split beams directly to the aspherical mirror, and
wherein the plurality of split beams are reflected by the aspherical mirror to be provided to the camera.

12. The inspection apparatus of claim 11, wherein the HSI apparatus is further configured to inspect a hyperspectral image of a line-shaped portion of the wafer.

13. The inspection apparatus of claim 12, wherein the inspection apparatus is configured to scan the wafer with the input beam in a direction perpendicular to an extension direction of the line-shaped portion.

14. The inspection apparatus of claim 11, wherein the HSI apparatus is further configured to generate a hyperspectral image, which has a first axis corresponding to a wavelength axis and a second axis corresponding to a spatial axis, based on the plurality of split beams, the second axis being perpendicular to the first axis.

15. The inspection apparatus of claim 11, further comprising:
a compensation lens between the slit plate and the aspherical mirror, the compensation lens configured to compensate for aberration between wavelengths of the output beam,
wherein the compensation lens comprises one of a spherical lens and a cylindrical lens.

16. The inspection apparatus of claim 11, further comprising:
a mirror arranged on an optical path of the plurality of split beams between the aspherical mirror and the camera, the mirror configured to reflect the plurality of split beams in a direction away from the grating.

17. An inspection apparatus comprising:
a dichroic mirror configured to split an output beam into a first output beam having a first wavelength band and a second output beam having a second wavelength band that is different from the first wavelength band;
a first hyperspectral imaging (HSI) optical system, which comprises a first aspherical mirror configured to reflect the first output beam, a first planar grating having a planar reflective surface configured to generate a plurality of first split beams by reflecting the first output beam, and a first camera configured to receive the plurality of first split beams to obtain at least one of a two-dimensional HSI image and a 3-dimensional hyper-cube image; and
a second HSI optical system, which comprises a second aspherical mirror configured to reflect the second output beam, a second grating configured to generate a plurality of second split beams by reflecting the second output beam, and a second camera configured to receive the plurality of second split beams to obtain at least one of a two-dimensional HSI image and a 3-dimensional hyper-cube image,
wherein the reflection of the first output beam by the first aspherical mirror is directly reflected to the first planar grating from the first aspherical mirror,
wherein the first planar grating provides the plurality of first split beams directly to the first aspherical mirror,
wherein the plurality of first split beams are reflected by the first aspherical mirror to be provided to the first camera,
wherein the reflection of the second output beam by the second aspherical mirror is directly reflected to the second grating from the second aspherical mirror,
wherein the second grating provides the plurality of second split beams directly to the second aspherical mirror, and
wherein the plurality of second split beams are reflected by the second aspherical mirror to be provided to the second camera.

18. The inspection apparatus of claim 17, further comprising:
a first slit plate between the first aspherical mirror and the dichroic mirror, the first slit plate configured to limit a cross-section of the first output beam; and
a second slit plate between the second aspherical mirror and the dichroic mirror, the second slit plate configured to limit a cross-section of the second output beam.

19. The inspection apparatus of claim 17, further comprising:
a slit plate configured to limit a cross-section of the output beam.

20. The inspection apparatus of claim 17, wherein the number of grooves per millimeter in the first planar grating is greater than the number of grooves per millimeter in the second grating.

* * * * *